318-135
7/19/83
SR
XR 4,394,592

United States Patent [19]

Pataki

[11] 4,394,592

[45] Jul. 19, 1983

[54] LONG STROKE LINEAR ACTUATOR

[75] Inventor: Andrew B. Pataki, Lansdale, Pa.

[73] Assignee: Sperry Corporation, New York, N.Y.

[21] Appl. No.: 191,788

[22] Filed: Sep. 29, 1980

[51] Int. Cl.[3] .............. H02K 41/00

[52] U.S. Cl. .............. 310/12; 318/135

[58] Field of Search .............. 310/12–14, 310/34, 35; 318/135

[56] References Cited

U.S. PATENT DOCUMENTS

| | | | |
|---|---|---|---|
| 3,219,854 | 11/1965 | McLaughlin | 310/14 |
| 3,430,120 | 2/1969 | Kotaka et al. | 310/14 X |
| 3,763,412 | 10/1973 | Detrick et al. | 310/14 X |

*Primary Examiner*—Donovan F. Duggan

*Attorney, Agent, or Firm*—James R. Bell; Marshall M. Truex

[57] ABSTRACT

Disclosed is an electrically operated linear actuator which is modular in design such that each module provides a component of force required to cause translational motion to a load via a linear shaft. The actuator is designed so that all modules of the actuator are utilized to provide a maximum force for initial movement of the shaft, whereas only the last module is utilized to provide a minimum force when the shaft has completed most of its translational motion. Intermediate modules between the first and last modules provide components of force for translating the shaft that vary in a uniformly ascending order from the minimum to the maximum forces.

1 Claim, 8 Drawing Figures

LONG STROKE LINEAR ACTUATOR

BACKGROUND OF THE INVENTION

1. Field of the Invention

This invention relates to a field of linear electrical actuators, and in particular to actuators that are modular in design.

2. Description of the Prior Art

In known, non-modular, single coil type actuators or solenoids, severe impact-bottoming is a characteristic thereof because of the large masses of their armatures. Impact-bottoming may be described as a collision between an energized coil of a solenoid and its moving armature. When relatively large masses are utilized, impact-bottoming can cause wear and tear on the structure of the solenoid so that failure may readily result. The present invention is designed to overcome the shortcomings of the prior art by minimizing impact-bottoming of the solenoid by providing a relatively "soft landing" between the energized coil and its armature. In accordance with this invention, the total actuating mass decreases during the length of its stroke whereby, at the end thereof, it is at a minimum value.

SUMMARY OF THE INVENTION

The invention provides an electrically operated long stroke linear actuator for translating an internal shaft member with respect to a load. The actuator is comprised of a plurality of contiguous modules wherein each includes an armature which is differently gapped. In a multi-armature design, the modules are arranged so that the gaps vary in length in an ascending order from the minimum to the maximum.

When the respective coils of each armature are simultaneously energized, the forces generated for translating the shaft with respect to the load are the contribution of all armature elements. When the module having the minimum armature gap almost bottoms (i.e., the armature closes on its coil), the forces produced by the sum of all modules will peak. As the minimum gapped armature bottoms, the total force acting upon the shaft is suddenly reduced. Similarly, with further translational movement of the shaft, the armature within the module next in line will bottom until only one armature gap will remain to be closed. The closing of the armature in the last module only, which originally had the maximum gap, will provide the force remaining on moving the shaft.

Accordingly, it is the object of the present invention to provide for a linear actuator which applies more force in moving the actuator shaft when it is at rest and when its inertia is the greatest, whereas less force is applied in moving the shaft when its inertia is at a minimum and when it has traversed nearly all of its stroke. In a single coil solenoid, less force is generated to start the stroke of the shaft and a high force is produced when the armature bottoms.

It is another object of the present invention to provide for a constant force linear actuator which may be readily adapted for various stroke lengths as needed by simply providing additional armature modules. In this case, all that is required is that spacers between adjacent modules be stacked in increasing widths.

It is another object of this invention to initially produce a larger force to accelerate shaft motion, and at the end of a stroke to produce a lesser force to minimize severe bottoming.

DESCRIPTION OF THE PREFERRED EMBODIMENT

Figure 1:
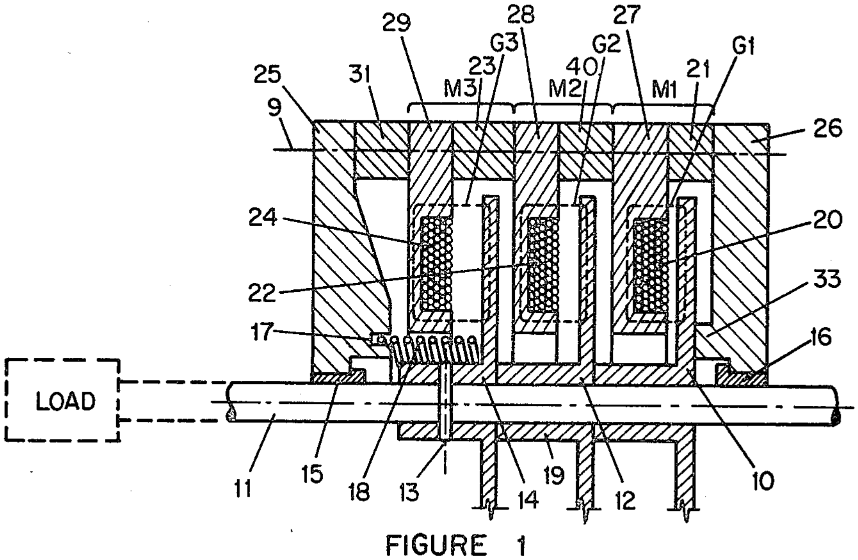
FIG. 1 is a cross-sectional view of the electrical actuator or solenoid of this invention.
Figures 2A, 2B, 2C:
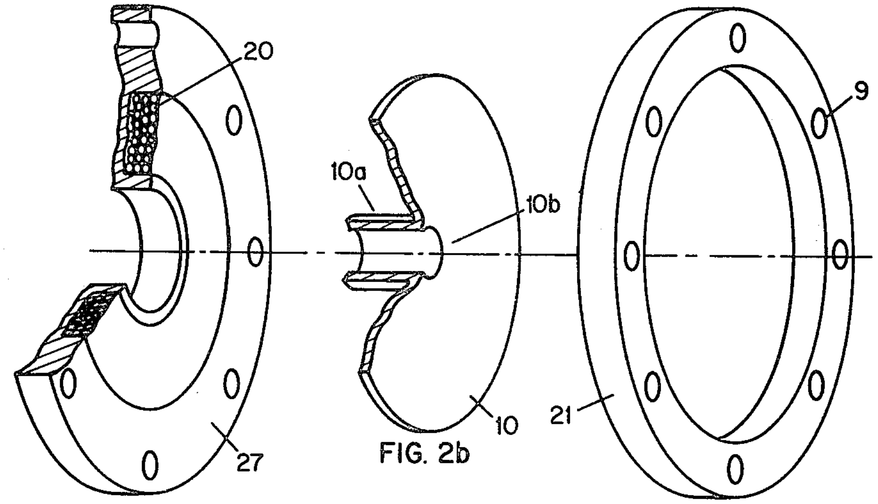
FIGS. 2*a*, 2*b* and 2*c* are isometric views of certain components utilized in the actuator of FIG. 1.

Referring now to FIG. 1 in detail, there is depicted a sectional view of the constant force linear actuator of this invention in a non-energized, or quiescent, position. The invention is comprised essentially of a plurality of modules, M1, M2, M3. Each module is comprised of a moveable armature 10, 12, 14, which is made of high permeable steel. The armature 10, which is representative of armatures 12, 14, is shown in greater detail in FIG. 2*b*. As can be readily appreciated, the armature 10 of FIG. 2*b* is designed with a central hub 10*a* containing an aperture 10*b*. The aperture 10*b* is designed so as to receive a slideable shaft 11 (FIG. 1), which is coupled to a load by suitable means (not shown).

Also contained within each module M1, M2, M3, and module M1 in particular, is an electrical coil 20 which is adapted to be connected to a source of electrical A.C. or D.C. power. The coil 20 is embedded in stationary flange 27, which is shown in greater detail in FIG. 2*a*. The stationary flange 27 is made of a high permeable material so that a magnetic field produced by coil 20 when energized will be concentrated therein as well as within the armature 10. In other words, the magnetic field produced by the energized coil 20 is sufficiently concentrated within the high permeable material of armature 10 and stationary flange 27 so as to readily provide a magnetic circuit for producing a magnetic field as shown by the closed dotted loop. The module M1 is also comprised of a spacer 21. The spacer 21 is made of any suitable nonferrous material, such as plastic, and serves as a means to properly position the armature 10 with respect to the stationary flange 27. Expressed another way, the spacer 21 provides a means for producing a proper gap width G1, as will be appreciated in later paragraphs. The spacer 21 may be fabricated in laminar form, such as by means of stacked disks.

Referring now to an adjacent module to module M1 depicted in FIG. 1, namely module M2, it is readily apparent that it consists of the same elements as module M1. Thus, it utilizes a moveable armature 12 which is juxtaposed to a coil 22 embedded within a stationary flange 28. As understood, the armature 12 and the coil 22 contained within flange 28 include respective aperatures for allowing the shaft 11 to slidably move therein. The armature 12 and embedded coil 22 within stationary flange 28 are identical to the armature 10 shown in FIG. 26 and the coil 20 within flange 27 shown in FIG. 2*a*. Module M2, however, differs from module M1 in that spacer 40 is wider than spacer 21 by increasing the spacer thickness by the thickness of gap G1. Therefore, this will create a G2 gap which is twice the G1 gap. The spacer 40 is wider than spacer 21 in order to provide a wider gap G2 than gap G1. The reason for this distinction will be clearer in later paragraphs. It should be noted here, however, that the armatures 10, 12 are in a butting relationship to one another; that is, the hub portion (see 10*a*, FIG. 2*b*) of armature 10 abuts a back circular surface of armature 12. This is significant in the operation of the actuator of this invention as will become clearer in later paragraphs.

A third module, M3, is utilized in the present embodiment with modules M1, M2. Module M3 is similar to modules M1, M2 in that it utilizes a moveable armature 14, which cooperates with an electrical coil 24 embedded in a stationary flange 29. The armature 14 is positioned with respect to the stationary flange 29 by a distance to provide a gap G3. The gap G3 is provided by use of the spacer 23, which has a thickness of spacer 40 plus the thickness of gap G1. This spacer will create a gap in the third module equivalent to three times that of gap G1. The air gap G3, together with the high permeable path provided by armature 14 and flange 29, provide a magnetic circuit as indicated by the enclosed dotted line. It should again be noted that the armature 12 is in a butting relationship with armature 14, such that the hub 19 of armature 12 is in a butting relationship with a back surface of armature 14.

Armature 14, unlike armatures 10, 12, is permanently attached to slidable shaft 11 by a pin means 13, such that any movement of armature 14 will cause an equal movement of shaft 11. Module M3, which in this particular three module embodiment is an end module, is also distinguished by use of a spring 18 which fits into slot 17 formed in end plate 25. A spacer 31, which is similar to spacers 21, 40, 23, and as shown in greater detail in FIG. 2*c*, is utilized between the end plate 25 and flange 29. A second end plate 26 is utilized in conjunction with end plate 25, in order to keep modules M1, M2, M3 in closely coupled relationship to one another. All of the units are kept combined by means of nut and bolt device, as symbolized by an aperature 9. Each of the end plates 25, 26 is associated with a bearing 15, 16 for allowing the shaft 11 to easily slide within the actuator to perform work on the load.

In the unenergized, or quiescent, condition, the compression spring 18 exerts a force in a rightward direction to move the shaft 11 together with juxtaposed armatures 10, 12, 14 until the armature 10 abuts a stop shoulder 33 so that the solenoid is conditioned to act on the load.

Figure 3:
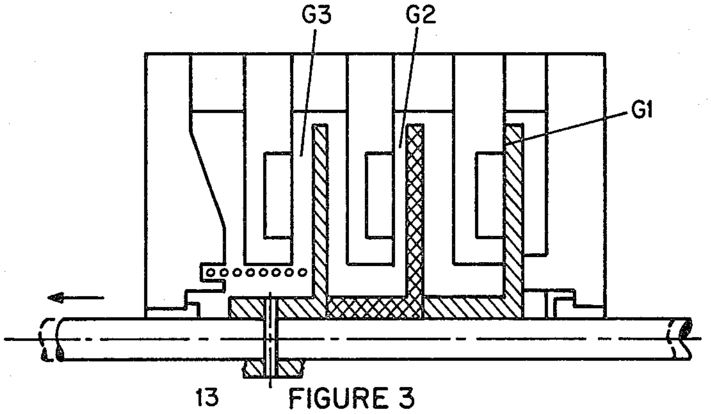
FIG. 3 is a view of the solenoid of FIG. 1 during phase one of its operation.

Reference is now made to FIG. 3, wherein a completion of a first phase of the operation of the actuator is shown. Thus, when the coils 20, 22, 24 are electrically energized, a magnetic field will be generated as shown by the enclosed dotted line in rectangular form (FIG. 1). It can also be readily seen in FIG. 1 that the air gap G1 associated with armature 10 of module M1 is the smallest of gaps G1, G2, G3. Accordingly, when coil 20 is energized simultaneously with coils 22, 24, a magnetic circuit is produced by current flowing in the coil wherein the field is indicated by the rectangular dotted line (FIG. 1).

The magnetic circuit produced by the energizing of the coils 20, 22, 24, is readily formed within the high permeable paths provided by respective flanges 27, 28, 29 and armatures 10, 12, 14. As is understood, the gap G1 provides the lowest reluctance path with respect to gaps G2, G3, because it is the narrowest. Therefore, the magnetic circuits described above produce magnetizing forces which attract armatures 10, 12, 14 toward their respective coils 20, 22, 24. In other words, the energizing of, for example, coil 20 causes a magnetic force F1 to be produced which causes the armature 10 to become magnetized; that is, every atom of the armature becomes aligned in a North-South direction, which is opposite to a North-South direction emanating from the coil 20. Consequently, the armature 10 is attracted to coil 20 and the gap G1 is closed. It should be understood hereat that since gap G1 has the smallest gap, and therefore the smallest reluctance in its magnetic circuit, the magnetizing force which attracts armature 10 to coil 20 is the greatest.

However, all of the armatures 10, 12, 14 work together as a single unit and, therefore, the closing of gap G1 by the movement of armature 10 in juxtaposition to coil 20 causes a leftward movement, as viewed in the drawing of the armatures 12, 14. Furthermore, since armature 14 is permanently attached to shaft 11 by pin 13, the shaft will move a distance corresponding to the closing of gap G1. This closing will be assumed to be a distance of one unit which, in turn, causes armatures 12, 14 to close by a distance of one unit. This leftward movement is indicated in dotted form along shaft 11.

Figure 6:
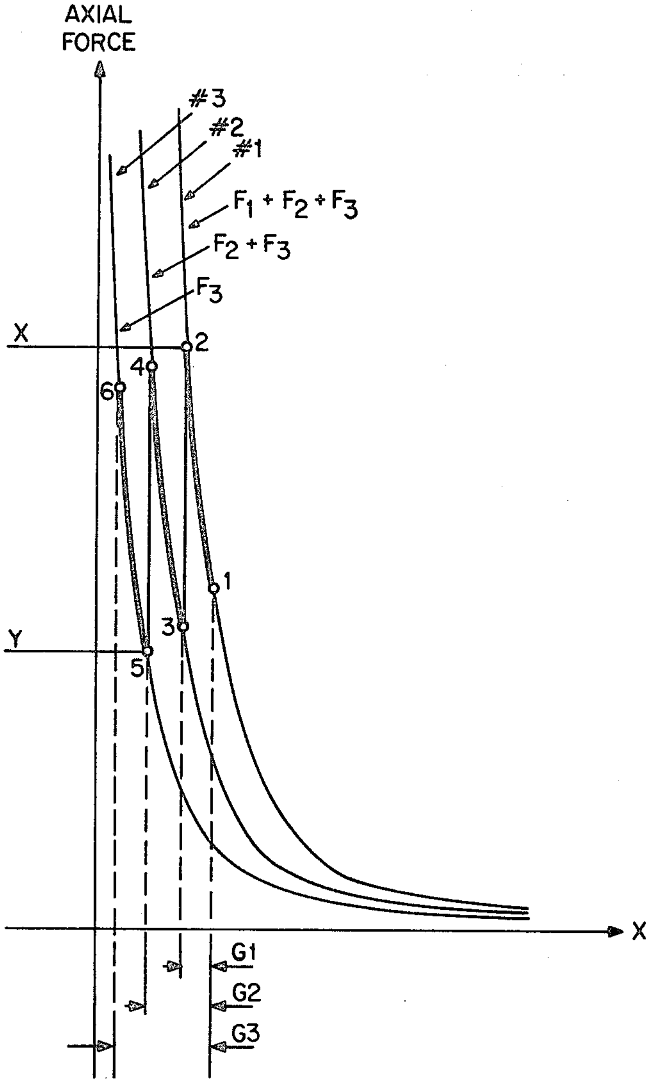
FIG. 6 is a graphic view of the operation of this invention during its three phases of operation.

Reference is now made to a force-displacement graph depicted in FIG. 6. The graph shows armature displacement along an abscissa and axial force along an ordinate of the graph. Since all three armatures 10, 12, 14 are attracted to their respective energizing coils 20, 22, 24, at the same time, three forces, F1, F2, F3, are simultaneously produced to move the shaft 11 leftwardly against the load. The greatest force F1 on shaft 11 is generated by the attraction of armature 10 toward coil 20; armature 12 towards coil 22 produces a lesser force F2 than F1; and armature 14 towards coil 24 produces a force F3, which is less than F2. The force F1 contributes the greatest force since it has the smallest gap. The sum of the three forces F1, F2 and F3, acting on shaft 11, are shown on curve #1 of FIG. 6 in moving from point 1 to point 2 wherein gap G1 (FIG. 3) is closed, and gaps G2, G3 are shortened by the G1 gap distance. In effect, the movement of armature 10 to close gap G1 causes armature 12 to move leftwardly by this distance and armature 14 to move by the same distance. Since armature 14 is pinned to shaft 11, the latter will move leftwardly the distance G1. By referring to FIG. 6, an observation to be made is that in initiating the movement of shaft 11 (FIG. 1), all forces F1, F2, F3 are acting together to produce a higher starting force to overcome inertia of the system and bring the shaft 11 up to speed faster.

Figure 4:
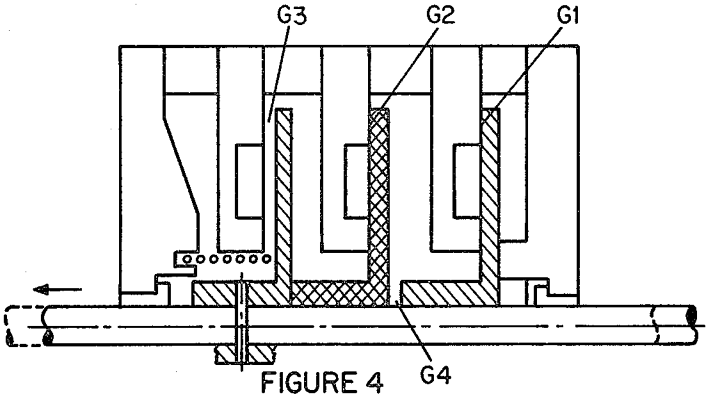
FIG. 4 is a view of the solenoid during phase two of its operation.

Referring now to FIG. 4, it is shown that armature 10 has already bottomed (represented as point 2 on graph #1 on FIG. 6), and when this position is reached, there is no further contribution from armature 10 and coil 20. FIG. 4 also indicates that armature 12 has bottomed upon coil 22. On the force-displacement curve of FIG. 6, a switch is made to curve #2 (i.e., points 3 to 4). During this second phase of the displacement of shaft 11 shown in FIG. 4, only armatures 12, 14 in association with their respective coils 24, 26, contribute to the movement of shaft 11 with armature 12 now dominating, since it is only one unit's distance away from coil 22, whereas armature 14 is now two unit's distance away. The curve #2 of FIG. 6 indicates that, in traversing point 3 to point 4, the forces F2, F3 produced by armatures 12, 14 are lower in value than in traversing point 1 to point 2. This is the result of the fact that in moving from point 3 to point 4, armature 10 no longer contributes because it has already bottomed against coil 20 (see FIG. 3). The linear armature movement G2, as shown along that ordinate or X axis of the curve #2 of FIG. 6, indicates the total gap distance G2 traversed by armature 12 from a time that all of coils 20, 22, 24 were simultaneously energized. As can be appreciated, in applying the forces F2, F3, in moving from point 3 to point 4, the distance travelled during phase 2 by armature 12 as well as shaft 11 against the load is the distance of gap 2 less the distance of gap 1. Gap 4 between armatures 10, 12, indicates an axial sliding action that takes place between these modules.

When armature 12 bottoms as is shown in FIG. 4, there will be no more force contribution from armature 12 in conjunction with coil 22 and a switch is made to force curve #3 (FIG. 6). After the system has switched to force curve #3, there is only one force F3 remaining to be applied to shaft 11.

In summary, therefore, bottoming of armature 12 against coil 22 causes armature 14 to move leftwardly and thereby to move shaft 11 leftwardly against the load due to the placement of pin 13 therethrough. The distance moved by shaft 11 during phase two of operation is the distance provided by gap G2-G1 (FIG. 6) and the forces required to move this distance are F2, F3, which is less than the forces F1, F2, F3 required to move the distance of gap G1.

Figure 5:
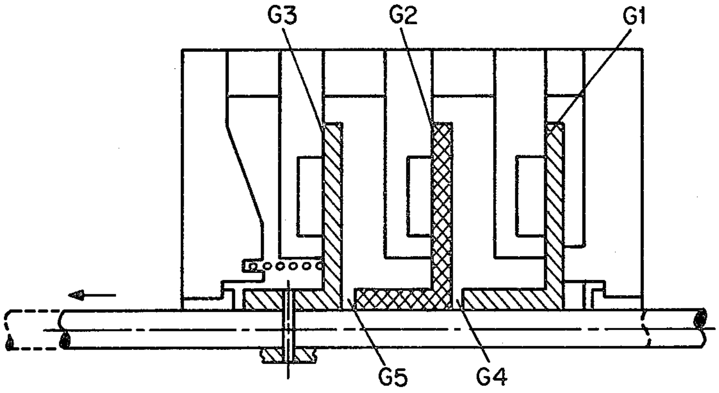
FIG. 5 is a view of the solenoid during phase three of its operation.

During the third and last phase of the operation, the armature 14 will close the remaining portion of gap G3, which has only one unit of distance of travel remaining, by being attracted to the coil 24 so that it bottoms as shown in FIG. 5 against coil 24 to thereby compress spring 17. Accordingly, the remainder of gap G3 or one unit of distance will close and shaft 11 will have traversed the entire distance against the load comprising G3. The distance moved by the shaft 11 during the third and last phase of operation is the distance provided by gaps G3-G2. It should be noted hereat that the forces F1, F2, F3 applied to shaft 17 are relative uniform over the length of the stroke G3. This can be appreciated by referring to FIG. 6, wherein the forces F1, F2, F3 are produced within a narrow range x-y. The uniformity of the applied forces are significant in that the shaft 17 traverses its stroke with relative smoothness.

It may be readily appreciated from the above-described operation that the initial force that is generated comprising F1+F2+F3 is higher than its final bottoming force F3. This is meaningful since in a conventional design when an armature is open and the gap is maximum, the initial force is less than the present invention just when it is most needed to accelerate the load and the actuator mass. On the other hand, when the armature of the single coil type approaches bottom, the gap is minimum and the rapidly increasing forces impact the armature against the stationary poles which can cause damage.

In this invention, the low impact force at the bottoming of the last armature 14 results from the non-contributing masses of armatures 10, 12, which were successively detached after initially contributing to the leftward movement of shaft 17.

In addition to the above-described distinct advantage over known prior art large, single coil actuators, the actuator of this invention lends itself to one which can readily provide a long shaft stroke. This results from its modular design which permits identical modules to be readily added to one another until a desired stroke is obtained. The only variation required in the modular design is that adjacent spacers (21, 40, 23 of FIG. 1) must be varied.

What is claimed is:

1. A linear actuator for moving a shaft comprising:
   - a plurality of successive modules mounted on said shaft, each module including an armature, a spacer and a flange;
   - a first one of said modules being adjacent an endplate;
   - only said first module having an armature fixedly connected to said shaft;
   - means for urging each armature into engagement with an adjacent armature, said means including a resilient member only in said first module between said endplate and said fixed armature;
   - said first module flange and armature having a gap therebetween;
   - each module armature and flange having a gap therebetween; and
   - said first module gap being greater than any successive module gap.

* * * * *